United States Patent [19]

Ihara et al.

[11] Patent Number: 5,145,925
[45] Date of Patent: Sep. 8, 1992

[54] CHLOROTRIFLUOROETHYLENE/PERFLUORO(ALKYL VINYL ETHER) COPOLYMER

[75] Inventors: Kiyohiko Ihara; Fumihiko Yamaguchi, both of Osaka, Japan

[73] Assignee: Daikin Industries Ltd., Osaka, Japan

[21] Appl. No.: 680,112

[22] Filed: Apr. 3, 1991

[30] Foreign Application Priority Data

Apr. 4, 1990 [JP] Japan ................... 2-90894

[51] Int. Cl.⁵ ............................. C08F 16/24
[52] U.S. Cl. ............................. 526/247; 526/249; 526/255
[58] Field of Search ............ 526/247, 249, 255

[56] References Cited

U.S. PATENT DOCUMENTS

| | | |
|---|---|---|
| Re. 32,199 | 7/1986 | Carlson ................ 526/247 |
| 2,856,435 | 10/1958 | Lo ...................... 526/247 |
| 2,975,163 | 3/1961 | Lo ...................... 526/247 |
| 3,132,123 | 5/1964 | Harris, Jr. et al. ...... 526/247 |
| 3,180,895 | 4/1965 | Harris, Jr. et al. ...... 526/247 |
| 3,752,789 | 8/1973 | Khan .................... 526/247 |
| 4,262,101 | 4/1981 | Hartwimmer et al. ...... 526/247 |
| 4,381,384 | 4/1983 | Khan .................... 526/247 |
| 4,587,316 | 5/1986 | Nakagawa et al. ........ 526/247 |
| 4,619,983 | 10/1986 | Tomabe et al. .......... 526/247 |

FOREIGN PATENT DOCUMENTS 59-173109  10/1984  Japan.
59-173110  10/1984  Japan.

*Primary Examiner*—Joseph L. Schofer
*Assistant Examiner*—N. Sarofim
*Attorney, Agent, or Firm*—Birch, Stewart, Kolasch & Birch

[57] ABSTRACT

A copolymer comprising chlorotrifluoroethylene and 0.01 to 1% by mole of perfluoro(alkyl vinyl ether) of the formula:

$$R_f\text{—O—CF}=CF_2 \qquad (I)$$

wherein $R_f$ is a $C_3$-$C_6$ perfluoroalkyl group, and having a melt flow rate of 0.01 to $200 \times 10^{-3}$ cc/sec., which has good mechanical strength and sufficiently high melting point.

4 Claims, No Drawings

CHLOROTRIFLUOROETHYLENE/PERFLUORO(ALKYL VINYL ETHER) COPOLYMER

BACKGROUND OF THE INVENTION

1. Field of the Invention

The present invention relates to a chlorotrifluoroethylene/perfluoro(alkyl vinyl ether) copolymer. In particular, the present invention relates to a chlorotrifluoroethylene/perfluoro(alkyl vinyl ether) copolymer which contains the perfluoro(alkyl vinyl ether) in a specific amount and has a specific melt flow rate.

2. Background Information

Since polychlorotrifluoroethylene is a fluororesin having good moisture proof properties, transparency or mechanical strength, it is widely used for various purposes. For example, it is molded in a pipe form and used as a level gage, or it is used as a moisture-proof film.

Since polychlorotrifluoroethylene, when used, is very easily crystallized, and loses its transparency or becomes brittle as time passes. Crystallization polychlorotrifluoroethylene is prevented by copolymerization with vinylidene fluoride. However, in this case, when an amount of vinylidene fluoride is too small, the crystallization is not prevented, while when the amount of vinylidene fluoride is too large, a melting point of a copolymer is decreased or mechanical strength of the copolymer is greatly deteriorated.

SUMMARY OF THE INVENTION

An object of the present invention is to provide a copolymer of chlorotrifluoroethylene which does not suffer from decrease of a melting point or deterioration of mechanical strength and can prevent crystallization advantageously.

According to the present invention, there is provided a copolymer which comprises chlorotrifluoroethylene and 0.01 to 1% by mole of perfluoro(alkyl vinyl ether) of the formula:

$$R_f\text{—O—}CF\text{=}CF_2 \quad (I)$$

wherein $R_f$ is a $C_3$—$C_6$ perfluoroalkyl group, and has a melt flow rate of 0.01 to 200 × $10^{-3}$ cc/sec.

DETAILED DESCRIPTION OF THE INVENTION

The perfluoro(alkyl vinyl ether) to be copolymerized with chlorotrifluoroethylene according to the present invention is an ether of the formula (I). The perfluoroalkyl group $R_f$ of the formula (I) has 3 to 6 carbon atoms and may optionally have at least one substituent. Specific examples of the perfluoroalkyl group are a perfluoropropyl group, a perfluorobutyl group, a perfluoro(propoxypropyl) group, and the like. In view of easy availability and low cost, perfluoro(propyl vinyl ether) is preferred.

The content of the perfluoro(alkyl vinyl ether) (I) in the copolymer is from 0.01 to 1% by mole.

When the content of the perfluoro(alkyl vinyl ether) is increased, the crystallization of the copolymer can be effectively prevented but the melting point of the polymer is decreased and the copolymer becomes soft so that the mechanical strength is deteriorated. Preferably, the content of perfluoro(alkyl vinyl ether) is from 0.05 to 0.5% by mole.

When the content of perfluoro(alkyl vinyl ether) exceeds 1% by mole, a polymerization rate is decreased to 50% or less of a homopolymerization rate of chlorotrifluoroethylene. Such low polymerization rate is uneconomical, or at such low polymerization rate, a polymerization degree may not be increased.

The copolymer of the present invention may be prepared by a per se conventional method. In general, the copolymerization is carried out in an autoclave equipped with a stirrer. Preferably, aqueous suspension polymerization is employed. In this case, a weight ratio of water to chlorotrifluoroethylene is from 1/10 to 10/1. A polymerization temperature is from 0° to 100° C., preferably from 5° to 30° C. A polymerization pressure is determined by a vapor pressure of chlorotrifluoroethylene and in turn the polymerization temperature.

A weight of the perfluoro(alkyl vinyl ether) (I) to be copolymerized depends on the type of the perfluoro(alkyl vinyl ether) (I). A method for the changing of the perfluoro(alkyl vinyl ether) (I) is not critical, and all of the perfluoro(alkyl vinyl ether) (I) may be added to the reaction system in an initial stage or may be added portionwise or continuously.

As a polymerization initiator, an organic peroxide is preferably used. Among the organic peroxides, to improve heat stability of the produced copolymer, organic peroxides of the following formulas are preferably used:

$$[Cl(CF_2CFCl)_m\text{—}CF_2COO]_2$$

wherein m is an integer of 1 to 5, and $$[X(CF_2CF_2)_nCOO]_2$$

wherein n is an integer of 1 to 5, and X is a hydrogen atom, a fluorine atom or a chlorine atom.

In the present invention, the composition and properties of the copolymer are measured as follows:

Content of perfluoro(alkyl vinyl ether)

The content of the perfluoro(alkyl vinyl ether) is measured by $^{19}F$ FT-NMR of a solution of the copolymer in benzotrifluoride. That is, the content of the perfluoro(alkyl vinyl ether) is calculated from a ratio of an integrated strength of a peak assigned to the side chain perfluoro(alkyl ether) groups to those of other peaks from $^{19}F$ NMR spectrum.

Melt flow rate

By using a KOKA-Type flow tester, a melt flow rate is measured by extruding a melt of the copolymer from a nozzle having a diameter of 1 mm and a length of 1 mm under a load of 100 kg/cm² at 230° C.

Bending crack test

From a sheet which is molded by heat press and has a thickness of 1 mm, a sample having a length of 60 mm and a width of 8 mm is cut out and heated in an electric furnace at 100° C. for one hour to prepare a test sample. Each sample is bent by a bending modulus tester with increasing a bending angle by 10 degrees, and an angle at which the sample is first whitened on bending is measured as a whitening start angle. The larger whitening start angle means better suppression of crystallization.

PREFERRED EMBODIMENTS OF THE INVENTION

The present invention will be illustrated by following Examples, in which "parts" are by weight.

EXAMPLE 1

Preparation of a chlorotrifluoroethylene polymer modified with 0.05% by mole of perfluoro(propyl vinyl ether)

In a jacketed polymerization reactor equipped with a stirrer which could contain 4000 parts of water, deionized deaerated water (1000 parts) and sodium hydrogencarbonate (0.75 part) were charged. After replacing the interior atmosphere with pure nitrogen gas, the nitrogen gas was evacuated under reduced pressure. Then, chlorotrifluoroethylene (1000 parts), perfluoro(propyl vinyl ether) (10 parts) and carbon tetrachloride (10 parts) were injected under pressure. After adjusting the interior temperature at 20° C., stirring was started. To the stirred mixture, a solution of $[Cl(CF_2CFCl)_2-CF_2COO]_2$ in trichlorotrifluoroethane (0.3 g/ml) (13 parts) was added as a polymerization initiator to initiate polymerization. After 24 hours polymerization, unreacted chlorotrifluoroethylene was purged, and a resulting copolymer was recovered, washed with warm water and dried to obtain powdery copolymer (370 parts).

A composition and properties of the copolymer are shown in the Table.

EXAMPLE 2

Preparation of a chlorotrifluoroethylene polymer modified with 0.5% by mole of perfluoro(propyl vinyl ether)

In the same manner as in Example 1 but charging 107 parts of perfluoro(propyl vinyl ether) and no carbon tetrachloride, polymerization was carried out to obtain a powdery copolymer (240 parts).

A composition and properties of the copolymer are shown in the Table.

COMPARATIVE EXAMPLE 1

Preparation of a chlorotrifluoroethylene polymer modified with 1.1% by mole of perfluoro(propyl vinyl ether)

In the same manner as in Example 1 but charging 244 parts of perfluoro(propyl vinyl ether) and no carbon tetrachloride, polymerization was carried out to obtain a powdery copolymer (120 parts).

A composition and properties of the copolymer are shown in the Table.

COMPARATIVE EXAMPLE 2

Preparation of a chlorotrifluoroethylene polymer modified with 4.0% by mole of vinylidene fluoride In a jacketed polymerization reactor equipped with a stirrer which could contain 4000 parts of water, deionized deaerated water (1000 parts) and sodium hydrogencarbonate (0.75 part) were charged. After replacing the interior atmosphere with pure nitrogen gas, the nitrogen gas was evacuated under reduced pressure. Then, chlorotrifluoroethylene (1000 parts), vinylidene fluoride (16 parts) and carbon tetrachloride (8 parts) were injected under pressure. After adjusting the interior temperature at 20° C., stirring was started. To the stirred mixture, a solution of $[Cl(CF_2CFCl)_2-CF_2COO]_2$ in trichlorotrifluoroethane (the same concentration as in Example 1) (10 parts) was added as a polymerization initiator to initiate polymerization. During polymerization, vinylidene fluoride (10 parts) was additionally added over 48 hours to make the gas composition in the reactor constant, and after 24 hours from the start of the polymerization, the same solution of $[Cl(CF_2CFCl)_2-CF_2COO]_2$ in trichlorotrifluoroethane as above (10 parts) was added. The total polymerization time was 48 hours. Thereafter, unreacted chlorotrifluoroethylene was purged, and a resulting copolymer was recovered, washed with warm water and dried to obtain powdery copolymer (580 parts).

A composition and properties of the copolymer are shown in the Table.

COMPARATIVE EXAMPLE 3

Preparation of a homopolymer of chlorotrifluoroethylene

In a jacketed polymerization reactor equipped with a stirrer which could contain 4000 parts of water, deionized deaerated water (1000 parts) and sodium hydrogencarbonate (0.75 part) were charged. After replacing the interior atmosphere with pure nitrogen gas, the nitrogen gas was evacuated under reduced pressure. Then, chlorotrifluoroethylene (1000 parts) was injected under pressure. After adjusting the interior temperature at 20° C., stirring was started. To the stirred mixture, a solution of $[Cl(CF_2CFCl)_2-CF_2COO]_2$ in trichlorotrifluoroethane (the same concentration as in Example 1) (3 parts) was added as a polymerization initiator to initiate polymerization. After 24 hours from the start of the polymerization, the same solution of $[Cl(CF_2CFCl)_2-CF_2COO]_2$ in trichlorotrifluoroethane as above (1.5 parts) was added. The total polymerization time was 42 hours. Thereafter, unreacted chlorotrifluoroethylene was purged, and a resulting copolymer was recovered, washed with warm water and dried to obtain powdery copolymer (460 parts).

A composition and properties of the copolymer are shown in the Table.

TABLE

| Example No. | Modifier (mol %) | Melt flow rate ($\times 10^{-3}$ cc/sec.) | Melting point (°C.) | Heat of fusion (cal/g) | Crystallization temp. | Tensile properties[*] YS (kg/cm$^2$) | TS (kg/cm$^2$) | EL (%) | Whitening start angle (°) |
|---|---|---|---|---|---|---|---|---|---|
| 1 | Perfluoro-(propyl vinyl ether) (0.05) | 27.6 | 213.5 | 5.22 | 174.0 | 424.7 | 257.2 | 49.5 | 60 |
| 2 | ↑ (0.5) | 2.65 | 201.0 | 3.04 | 164.0 | 389.4 | 262.3 | 61.5 | 90 |
| Comp. 1 | ↑ (1.1) | 27.6 | 189.5 | 2.45 | 146.0 | 368.2 | 269.2 | 139.8 | 90 |
| Comp. 2 | Vinylidene fluoride (4.0) | 59.0 | 193.5 | 4.61 | 153.0 | 367.8 | 219.7 | 64.2 | 60 |

TABLE-continued

| Example No. | Modifier (mol %) | Melt flow rate ($\times 10^{-3}$ cc/sec.) | Melting point (°C.) | Heat of fusion (cal/g) | Crystallization temp. | Tensile properties[*] YS (kg/cm$^2$) | TS (kg/cm$^2$) | EL (%) | Whitening start angle (°) |
|---|---|---|---|---|---|---|---|---|---|
| Comp. 3 | — | 39.4 | 213.5 | 4.81 | 178.5 | 441.7 | 274.7 | 72.5 | 40 |

Note:
[*]YS: Yield Stress
TS: Tensile strength
EL: Elongation

What is claimed is:

1. A copolymer which comprises chlorotrifluoroethylene and 0.01 to 1% by mole of perfluoro(alkyl vinyl ether) of the formula:

$$R_f-O-CF=CF_2 \qquad (I)$$

wherein $R_f$ is a $C_3-C_6$ perfluoroalkyl group, and has a melt flow rate of 0.01 to 200 $\times$ 10$^{-3}$ cc/sec.

2. The copolymer according to claim 1, wherein a content of said perfluro(alkyl vinyl ether) is 0.05 to 0.5% by mole.

3. The copolymer according to claim 1, wherein said perfluoro(alkyl vinyl ether) is perfluoro(propyl vinyl ether).

4. The copolymer according to claim 2, wherein said perfluoro(alkyl vinyl ether) is perfluoro(propyl vinyl ether).

* * * * *